July 21, 1964 A. TE-AN LING 3,142,042

APPARATUS FOR TRANSFERRING DATA FROM PUNCHED CARDS TO A MEMORY DEVICE

Filed May 3, 1960 2 Sheets-Sheet 1

INVENTOR.
ANDREW T. LING
BY John V. Regan
ATTORNEY

| FROM "OR" 118 | FROM MEMORY B-30 | "OR" 132 OUTPUT |
|---|---|---|
| 1 | 1 | 0 |
| 1 | 0 | 1 |
| 0 | 0 | 0 |
| 0 | 1 | 1 |

INVENTOR.
ANDREW T. LING
BY John V. Regan
ATTORNEY 3,142,042
APPARATUS FOR TRANSFERRING DATA FROM PUNCHED CARDS TO A MEMORY DEVICE Andrew Te-an Ling, Collingswood, N.J., assignor to Radio Corporation of America, a corporation of Delaware Filed May 3, 1960, Ser. No. 26,563
12 Claims. (Cl. 340—172.5)

This invention relates to apparatus for transferring data between two different storage media and, more particularly, although not exclusively, to apparatus for transferring data efficiently between a record card and the high speed memory of an information handling system.

Record cards are often used as the external file or input-output medium of an information handling system, such as a digital computer. A record card may be provided with N vertical columns each having M data storage positions defining rows. One standard card type, for example, has eighty columns and twelve rows, and each column stores a separate data character as a pattern of marks or perforations in selected ones of the twelve storage positions.

The computer, on the other hand, may be one designed to handle data represented by binary coded characters of six or seven bits each, six bits representing information and the seventh bit, when present, providing odd or even parity of the data bits. The computer may have a high speed memory which provides storage for data and programs, and the memory may be addressable such that data may be stored and retrieved in a unit or units of one or more characters at a time. For illustrative purposes, let the memory be accessible in units of two characters at one time. It has been suggested that eighty such pairs of characters store the data from a record card, each pair corresponding to a different column of the record card.

Card handling devices are mechanical in nature and are slow compared to the speed capabilities of the computer. It is desirable, therefore, to read and mark the cards row-by-row as opposed to column-by-column in order to reduce card handling time and thereby to achieve maximum speed in the hybrid arrangement. However, means must be provided for transferring a row of card data to and from the computer memory, which is addressable in "columnar" fashion.

Accordingly, it is an object of this invention to provide an efficient card processing system.

It is another object of this invention to provide apparatus for transferring data between two different storage media.

It is still another object of this invention to provide apparatus whereby information may be sensed row-by-row on a record card and stored column-by-column in a memory and, conversely, whereby information may be read in columnar form from a memory and recorded row-by-row on a record card.

It is a further object of this invention to provide apparatus for transferring N characters at a time from a first M by N storage matrix to a second M by N storage matrix which is accessible M characters at a time, and vice versa.

It is yet another object of the invention to provide apparatus for transferring data row-by-row from a record card and storing said transferred data in image form in a memory which is addressable column by column, and vice versa.

It is still another object of this invention to provide apparatus for transferring N characters of data at a time from a first M by N memory and storing said data in true image form in a second M by N memory which is addressable M characters at a time, and vice versa.

In a card processing system in accordance with the preferred embodiment of the invention, all data bits in a row of an M row x N column card are sensed simultaneously and the data converted to electrical signals occurring sequentially in point of time. A master clock provides N timing pulses for each row of sensed data. These timing pulses are applied to a counter, the output of which serves as the address for a high speed memory. Two characters are read out of the memory in response to each timing pulse, updated in the proper row position by the appropriate electrical signal, and the updated characters returned to the high speed memory. Each such pair of characters from the high speed memory is read out once for updating for each row of card data sensed. In general, the reverse of the above process is followed when data is read from the memory to card marking apparatus.

Another feature of the invention is the provision of parity checking means for the data stored in the high speed memory.

Still another feature of the invention is the provision of an extra card sensing station and associated circuitry for checking the accuracy of the data supplied to the high speed memory.

Further features and objects of the invention will be more fully apparent from a description of the drawing in which.

DESCRIPTION OF THE SYSTEM

Figure 1:
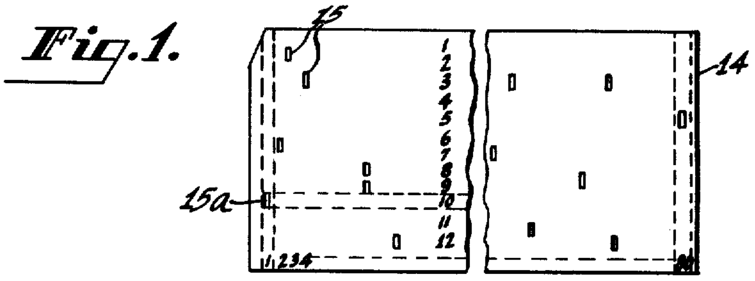
FIGURE 1 is a view of a portion of an 80 column by 12 row standard record card.

In general, a record card, which may be one of the aforementioned two storage media, has N columns and M rows. The storage positions on the card are at the intersections of the rows and columns. One standard type of record card 14 is illustrated in FIGURE 1 as having eighty vertical columns disposed along the length of the card 14, each column having twelve storage positions defining rows. Data may be recorded as perforations 15 or marks in selected storage positions. Perforation 15*a*, for example, is at the intersection of column one and row ten. Each column of the card 14 may store a character in a twelve-position code, and each different character is represented by a distinct combination of perforations 15 or marks in a column. Although the invention will be described hereinafter in connection with the FIGURE 1 record card 14, the invention is not limited to the use of this particular type of input and is independent of the particular coding scheme employed. Also, the computer memory need not be one designed to handle data in character format.

Figure 2:
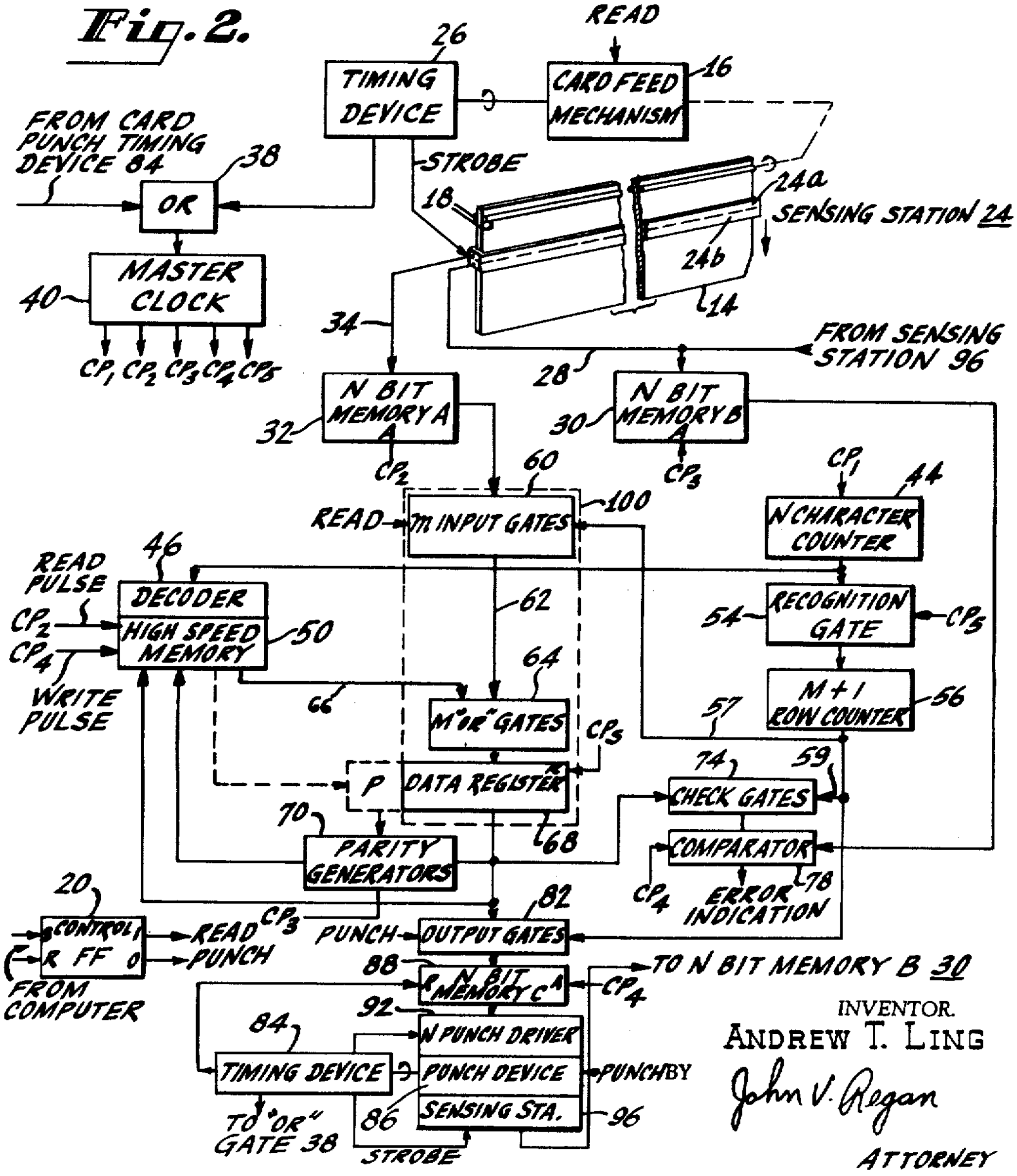
FIGURE 2 is a block diagram of a card processing system which includes the invention.

The data transfer apparatus of the invention is illustrated in block form in FIGURE 2 as part of a card processing system. The record cards 14 are moved singly, in the direction indicated by the arrow, under the control of a card feed mechanism, illustrated by a block 16. A pair of rollers 18 driven by the card feed mechanism 16 may supply drive to the card 14 in known manner. Operation of the card feed mechanism 16 is controlled by a "read" signal originating in the computer (not shown) and supplied by way of a control flip-flop 20. The flip-flop 20 has set (S) and reset (R) outputs energized respectively by computer signals applied to (1) and (0) input terminals.

The cards 14 are moved past a sensing station 24 which may comprise, for example, two parallel sets 24*a*, 24*b* of photodetectors. Each of the sets 24*a*, 24*b* has eighty photodetector elements for reading a row of data, and each set may be considered a separate sensing station. The sets 24*a*, 24*b* of photodetectors are spaced one card 14 row apart to enable simultaneous sensing of two adjacent rows of card 14 data. The outputs of the second set 24*b* of sensing elements are gated in parallel, upon command, to an N bit memory B 30 over a multichannel cable 28. Outputs of the first set of sensing elements are gated simultaneously and in parallel to an N bit memory A 32 over multichannel cable 34, also on command. Each of the memories 30, 32 may be an N stage shift register, where N is the number of columns of the record card 14 and is equal to eighty when the card 14 is the one illustrated in FIGURE 1.

A timing device 26 is synchronized with the operation of the card feed mechanism 16. Operation of the timing device is such that a series of electrical pulses (at least two) are generated as each row of data passes a set 24*a* or 24*b* of sensing elements. In actuality, thirteen series of pulses are generated for each card 14; twelve series are sychronized with the sensing of the twelve rows of card data by the first set 24*a* of sensing elements, the thirteenth series is synchronized with the sensing of the last row of card data by the second set of sensing elements 24*b*. The second sensing station 24*b* and the thirteenth series of timing pulses are provided for accuracy control, as will be described in detail hereinafter.

The timing device 26 may be, for example, an opaque disc (not shown) having slots therein, with optical means for sensing said slots and for generating electrical signals in response thereto. The disc may be geared to the card feed mechanism 16 such that the disc rotates once each time a card 14 moves a distance corresponding to one row of data. Such timing devices are known in the art and need not be described further. The leading edge of a card 14 may be detected to provide a signal for enabling the outputs of the time device 26.

Each series of timing pulses generated by the timing device 26 includes a "strobe" pulse for enabling the outputs of the sensing stations 24. The strobe pulse is timed to occur when a row of card data is in sensing position. The first strobe pulse for each card 14 occurs when the first or leading row of card 14 data is being sensed by the first set 24*a* of photodetectors; the thirteenth strobe pulse occurs when the last row of card 14 data is being sensed by the second set 24*b* of photodetectors. The strobe pulse is the aforementioned "command" for gating the outputs of the sensing stations 24*a*, 24*b* to the N bit memories 30, 32, respectively.

A second output from the timing device 26 is applied as one input to a two input "or" gate 38. The second input to the "or" gate 38 may be a timing pulse from a similar timing device 84 in the card punch or marking apparatus yet to be described. The output of the "or" gate 38 is applied to master clock 40 which may be, for example, a local oscillator feeding a tapped delay line. The master clock 40 provides N series (eighty in this case) of clock pulses $CP_1$ . . . $CP_5$ in response to each input timing pulse from the "or" gate 38.

The $CP_1$ clock pulse is applied to an N character counter 44 which may be, for example, a binary counter providing a binary output. The N character counter 44 receives N input pulses for each row of data sensed, and is arranged to reset after a count of N. The output of the N character counter 44 is applied to a decoder 46, the output of which provides the address for a high speed memory 50. The decoder 46 may be, for example, a diode decoder and the high speed memory 50 may be a magnetic core matrix. Such decoders 46 and memories 50 are well known in the art and need not be described in further detail.

The binary output of the N character counter 44 is applied also to a set of recognition gates 54 which are arranged to recognize a binary count of N and to provide an output at $CP_5$ when the N character counter 44 reaches a count of N. A suitable recognition gate for this purpose is described in U.S. Patent No. 2,926,337, issued February 23, 1960, to Luis A. Rivas, for Data Selection Device. The single output of the recognition gate 54 is applied as a trigger input to an $M+1$ row counter 56 which may be, for example, a ring counter. The counter 56 resets after a count of $M+1$, thirteen in this case.

The $CP_2$ clock pulses are applied to the advance (A) terminal of the N bit memory A 32 to gate information therefrom serially in point of time. The output from the memory A 32 is applied to each of a set of M input gates 60, shown in greater detail in FIGURE 3. The first M outputs of the row counter 56 are connected to different ones of the input "and" gates 60. A third input to each of the input "and" gates 60 is the "read" output from the (1) terminal of the aforementioned control flip-flop 20. The outputs of the input "and" gates 60 are applied over multichannel cable 62 to corresponding ones of a set of two input "or" gates 64. Two characters, corresponding to a column of the card 14, are read out from the high speed memory 50 in response to each $CP_2$ clock pulse and applied to corresponding ones of the "or" gates 64, shown in greater detail in FIGURE 3.

An "or" gate is well known in the art and may be defined as a device having one output and two or more inputs wherein the output is in a prescribed state when any one or more inputs is in a prescribed state. An "and" gate also is well known in the art and may be defined as a device or circuit having one output and two or more inputs, which has the property that the output is energized when, and only when, all the inputs are energized. The outputs of the M "or" gates 64 are applied in parallel as inputs to a data register 68 which may be, for example, a set of M individual binary storage stages such as flip-flops. The stages of the data register 68 are reset in response to the $CP_5$ clock pulse.

As described previously, the record card 14 may have twelve rows and eighty columns, and each column may contain an individual character as a combination of perforations or marks in the twelve positions of the column. The high speed memory 50 of the computer (not shown) may be designed to handle data represented by characters of six or more bits each, and the memory 50 may be addressed such that a pair of characters may be stored and retrieved at one time. Each pair of two such characters may store the information contained in one column in the card 14. Assuming, for example, that each computer character comprises seven bits, the two extra bits, one for each character in a pair, may be used to provide odd or even parity of the character information stored in the memory 50. The cumulative M data bits from the data register 68 may be applied in parallel to a pair of parity generators 70 which generate the proper parity for each of the $M/2$ or six data bits of the memory 50 characters. A suitable parity generator for this purpose is one of the general type disclosed in U.S. Patent No. 2,906,997. The outputs of the parity generators 70 and the M outputs of the data register 68 are applied to the high speed memory 50 and rewritten therein in the original character positions in response to the $CP_4$ clock pulse. The $CP_3$ clock pulse enables the parity generator output.

Figures 3, 4, 5, 6:
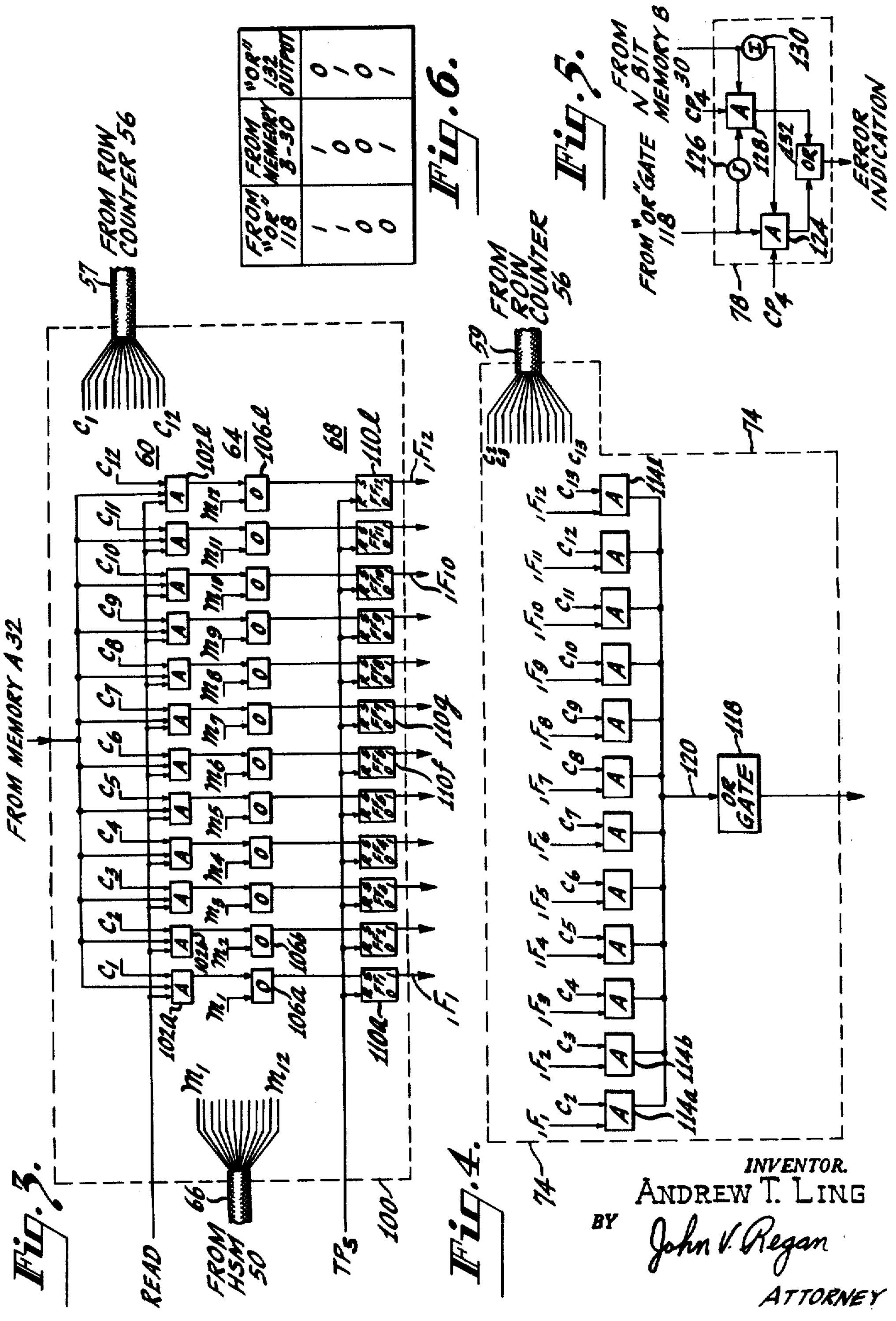
FIGURE 3 is a block diagram of the input gates, N "or" gates, and data register illustrated within the dashed box 100 of FIGURE 2.
FIGURE 4 is a block diagram of the FIGURE 2 check gates.
FIGURE 5 is a block diagram of a suitable comparator for use in the FIGURE 2 system.
FIGURE 6 is a "truth" table for the FIGURE 5 comparator.

The outputs of the data register 68 are also applied to a set of check gates 74 together with the second through the $M+1$th outputs of the row counter 56 in a manner shown more fully in FIGURE 4. The single output of the check gates 74 is applied to a comparator 78 together with the serial output of the N bit memory B 30. Information in the N bit memory B 30 is advanced serially in response to the $CP_3$ clock pulses. A third input to the comparator 78 is the $CP_4$ clock pulse. A suitable comparator 78 is illustrated in greater detail in FIGURE 5. The check gates 74 and comparator 78 are arranged to check the accuracy of the last complete data row read into the high speed memory 50. By way of further clarification, the second row of card data is stored in the N bit memory A 32 when the first row of card data is stored in N bit memory B 30. As the second row of data is being read to the high speed memory 50 by way of the "or" gates 64 and data register 62, the first row of data, already stored in the high speed memory 50, is checked against the output of the N bit memory B 30 by the comparator 78.

No data is stored in the N bit memory B 30 while the first row of data is being transferred from N bit memory A 32 to the high speed memory 50. The high speed memory 50 also initially contains no data. Therefore, a dummy check is performed by the comparator 74 during transfer of the first row of card 14 data. Transfer of the first row of card data to the proper image positions of the high speed memory 50 is complete after the first eighty series of clock 40 pulses. The first row of card 14 data stored in the high speed memory 50 then is checked by the comparator 78 with the first row of card data stored in the N bit memory B 30 while the second row of card 14 data is simultaneously transferred to the high speed memory 50 from the N bit memory A 32. The same procedure is followed during the transfer of succeeding rows of card data. After transfer of the twelfth or last row of card data is complete, the twelfth row of data is sensed by the second set **24*b* of photodetectors and gated to the N bit memory B 30. The N bit memory A 32 remains cleared at this time. The twelfth row of data, already transferred to the high speed memory 50, is then checked against the serial output of the N bit memory B 30 in the comparator 78** during the thirteenth series of eighty clock pulse sets.

It will be recognized that the card data stored in the high speed memory 50 has a different code format from that used in the computer itself. It is contemplated, however, that the code may be translated by known computer programming techniques for use in the processor or computer. The need for special code translators is thereby obviated, which results in considerable savings in hardware, especially when several different card coding schemes are employed. In like manner, computer output data may be translated to the particular card code by programming techniques, and the translated results stored temporarily in the high speed memory 50 for transfer.

The apparatus of the present invention may be used also to read data from the high speed memory 50 to a card punch or marking apparatus. In the latter event, the control flip-flop 20 provides an energizing signal on the (0) output terminal which is applied to a set of output gates 82. No "read" signal is present at the (1) output terminal under these conditions. The outputs of the data register 68 and the first M outputs of the row counter 56 are applied also to the output gates 82. The clock pulses $CP_1 \ldots CP_5$ are generated by the master clock 40 in response to a timing signal from a timing device 84 operated in synchronism with a punch or marking device 86. The timing device 84 also provides a strobe pulse to a single row sensing station 96 in the card punch equipment. The latter sensing station may comprise a row of photodetectors of the type described previously, the outputs of which are applied in parallel to the N bit memory B 30.

The single output of the output gates 82 is applied as a serial input to an N bit memory C 88 which is advanced in response to the $CP_4$ clock pulses. The output of the N bit memory C is applied in parallel to a set of N punch drivers 92 which may energize punch solenoids (not shown) in the punch device 86. A third output of the timing device 84 is applied to the reset (R) terminal of the N bit memory C 88 to reset the memory after a row of data has been punched. The memory C 88 may be, for example an N bit shift register. The check gates 74 and comparator 78 provide means for checking the last row of punched data while a new row of data to be punched is being read from the high speed memory 50. The punch drivers 92 are enabled at the proper time in the punch cycle by an output from the timing device 84.

INPUT GATES, "OR" GATES, AND DATA REGISTER

FIGURE 3 is a block diagram of the input gates 60, "or" gates 64, and data register 68 shown within the dashed box 100 of FIGURE 2. The input gates 60 comprise M "and" gates **102*a* . . . 102*l*, one for each of the M rows of the record card 10. The twelve "and" gates 102*a* . . . 102*l* are for the FIGURE 1 record card having twelve rows, that is to say, $M=12$. The output of the last stage of the N bit memory A 32 (FIGURE 2) is applied as a first input to each of the "and" gates 102*a* . . . 102l. The (1) or "read" output of the control flip-flop 20 is applied as a second input to each of the "and" gates. The first M outputs, twelve in this case, of the $M+1$ row counter 56 (FIGURE 2) are applied over multichannel cable 57, each to a different "and" gate 102*a* . . . 102*l*, respectively. $C_1$–$C_{12}$ outputs correspond respectively to the first through the twelfth outputs of the row counter 56. By way of example, the $C_1$ input to "and" gate 102*a* is energized when the first row of data is being sensed on the record card 14. Only this "and" gate 102*a*, therefore, may provide an output in response to a signal from memory A 32 at this time. The $C_1$ input remains energized throughout the period that the eighty bits of information from row one of card 14 are being read serially out of the memory A 32. The $C_2$ input to the second "and" gate 102*b* is energized during the period that the eighty bits of the second row are being read serially out of the memory A 32**.

The outputs of the "and" gates **102*a* . . . 102l are connected respectively to first inputs of a like plurality of two input "or" gates 106*a* . . . 106*l*. Each of the "or" gates also receives a different data output $m_1 \ldots m_{12}$ from the high speed memory 50 over a multichannel cable 66. By way of example, the output of the first "and" gate 102*a* updates the $m_1$ output from the high speed memory 50. When the second row of data is being shifted out of the N bit memory A 32, the output of the second gate 102*b* is applied to the second "or" gate 106*b* to update the $m_2$ output from the high speed memory 50**.

The data register 68 is illustrated in FIGURE 3 as a plurality of bistable flip-flop circuits **110*a* . . . 110*l*. Each of the flip-flops 110*a* . . . 110*l* receives at its set (S) input terminal the output of a different "or" gate 106*a* . . . 106*l*, respectively. The $CP_5$ clock pulse is applied to the reset (R) terminals of all flip-flops 110*a* . . . 110*l*. The first six flip-flops 110*a* . . . 110*f* supply the data for the six data bits of one of a pair of the aforementioned memory characters. The outputs of the other six flip-flops 110*g* . . . 110*l* supply the data for the six data bits of the other character of that pair. These twelve flip-flop outputs are coupled to the high speed memory 50 and also to the parity generators 70. The outputs of the parity generators 70 are coupled to the high speed memory 50 to provide the seventh data bits of each of the pair of characters. The two parity bits of the memory 50** characters may be brought out to two flip-flops (not shown) if desired, as illustrated in FIGURE 2.

CHECK GATES

The twelve outputs ${}_1F_1 \ldots {}_1F_{12}$ of the flip-flops **110*a* . . . 110*l* also are coupled to a set of check gates 74 (FIGURE 2). The check gates 74 are shown in block form in FIGURE 4 as a plurality of two input "and" gates 114*a* . . . 114*l*, equal in number to the number of rows on the record card 10. Each of the "and" gates 114*a* . . . 114*l* receives the output of a different flip-flop 110_a_ . . . 110_l_ of the data register 68. The second through the thirteenth (or $M+1$th) outputs of the row counter 56 are connected to the "and" gates 114_a_ . . . 114_l_ such that the first "and" gate 114_a_ receives an energizing signal from the $C_2$ output of the counter 56 when the second row of data is being shifted out of the N bit memory A 32. This arrangement provides means for checking the first row of card data, already stored in the high speed memory 50, with the first row of card data stored in the N bit memory B 30. In like manner, the second "and" gate 114_l_ receives an energizing signal from the $C_3$ output of the row counter 56 when the third row of data is being shifted out of the N bit memory A 32. The N bit memory B 30 stores the second row of card data at this time, the data being shifted out of the memory B serially to the comparator 78. Only one of the "and" gates 114_a_ . . . 114_l_ provides an output at any one time. The outputs of the "and" gates are applied to an "or" gate 118 over multichannel cable 120**.

COMPARATOR

One example of a suitable comparator 78 is illustrated in block form in FIGURE 5. The output of the "or" gate 118 (FIGURE 4) is coupled to one input of a three input "and" gate 124 and is also coupled to an inverter 126. The output of the inverter 126 is coupled to one input of a second, three input "and" gate 128. The serial output of the N bit memory B 30 is applied directly to a second input of the second "and" gate 128 and is coupled also to an inverter 130. The output of this inverter 130 is coupled to a second input of the first "and" gate 124. The $CP_4$ clock pulse is applied to the third inputs of the "and" gates 124, 128. The outputs of the "and" gates 124, 128 are coupled to a two input "or" gate 132, the output of which, when present, indicates an error in the transferred data.

FIGURE 6 is a "truth" table for the comparator 78 of FIGURE 5. "And" gate 124 provides an output only when each of its inputs is properly energized. This condition obtains at $CP_4$ only when the output from "or" gate 118 is high, corresponding to a binary "one" and the output from memory B 30 is low, corresponding to a binary "zero." The output of the second "and" gate 128 is high at $CP_4$ only when the output of memory B 30 is high, corresponding to a binary "one" and the output of the "or" gate 118 is low, corresponding to the binary "zero." It is thus seen that an error signal is generated by the "or" gate 132 whenever there is a lack of correspondence between the input signals to the comparator 78.

SYSTEM OPERATION

The system of FIGURE 2 has two modes of operation. Information is read from a record card 14 and transferred to the high speed memory 50 in the first mode. In the second mode, information is read out of the high speed memory 50 for transfer to a record card by way of a punch device 86.

FIRST MODE-CARD-TO-MEMORY

Consider now the first mode of operation of the system. Operation is commenced by a "read" signal supplied to the card handling mechanism 16. A record card 14 is moved past a first sensing station 24_a_. A first strobe pulse from the timing device 26 gates the outputs of the first sensing station 24_a_ when the first row of card 14 data is being sensed thereby, and the first row of card data is transferred in parallel to the N bit memory A 32. It is desired to transfer this data to the first "row" of the high speed memory 50. No data is stored in the N bit memory B 30 at this time.

The strobe pulse from the timing device 26 is followed by a pulse to the master clock 40 which, in turn, generates eighty sets of clock pulses $CP_1$ . . . $CP_5$, one set for each card 14 column. The first clock pulses $CP_1$ trigger a character counter 44 which supplies the address for the high speed memory 50. The first pair of characters in the high speed memory 50, for example, is addressed when the character counter stores the count of one. The $CP_2$ clock pulse brings this pair of characters out of the high speed memory 50 and, simultaneously, shifts the data one position in the N bit memory A 32. Said pair of characters corresponds to the card column which contains the data bit then being shifted out of the N bit memory A 32. The M input gates 60, under control of the row counter 56, assure that the memory A 32 output bit is inserted in the proper row position of said character pair. The updated character pair is stored temporarily in the data register 68. The parity bits of the high speed memory 50 characters may be brought out to the block marked "P" in the data register 68, if desired.

The outputs of the data register 68 are applied to the high speed memory 50 and to the parity generators 70. Parity is generated at $CP_3$. The updated character pair and corresponding parity bits are written into their original location in the high speed memory 50 in response to the $CP_4$ clock pulse. The $CP_5$ clock pulse resets the data register 68.

The second pair of characters, corresponding to the second card 14 column is brought out from the high speed memory 50 and updated, if updating is called for, by the next output bit of the N bit memory A 32 in response to the next set of clock pulses $CP_1$ . . . $CP_5$. The same procedure is followed until the entire first row of card 14 data is transferred to the high speed memory from the N bit memory A 32. Transfer of the entire first card 14 row is completed after the eightieth set of clock pulses from the clock 40. The character counter 44 is then reset automatically, and the row counter is stepped to a count of two.

The second row of card data is then in position to be sensed by the first sensing station 24_a_. The first row of card 14 data is sensed simultaneously by the second sensing station 24_b_. The next strobe pulse gates the second and first card row data respectively to the N bit memories 32, 30, respectively. The second row of data, now stored in N bit memory A 32, is inserted into the second "row" bit positions of the high speed memory 50, under the direction of the M input gates 60, during the next eighty sets of clock pulses. Simultaneously, the first row of high speed memory 50 data is checked against the contents of the N bit memory B 30 by the comparator 78. The check gates 74, under the control of the row counter 56, gate the bits of the first row of high speed memory data to the comparator 78 at this time.

Operation continues according to the above procedure until transfer of the last row of card 14 data to the high speed memory 50 is completed. The last row of card 14 data is then in position to be sensed at the second sensing station 24_b_. No data is sensed at the first station 24_a_ at this time. The output of the second sensing station 24_b_ is gated in parallel to the N bit memory B 30 by the next strobe pulse. This data is checked against the last "row" of high speed memory 50 data, already transferred, during the next eighty sets of clock pulses. However, no updating of the high speed memory 50 data takes place at this time because no "and" gate 102_a_ . . . 102 is energized.

It will be recognized that the check gates 74, comparator 78, N bit memory B 30, and the second sensing station 24_b_ may be eliminated from the system if it is deemed unnecessary to perform a check on the accuracy of transferred data.

The complete card data stored in the high speed memory 50 may be translated by computer programming for processing in the computer. Also the computer output may be translated by program and inserted in the high speed memory 50 in the card code format for read out to a card.

SECOND MODE-MEMORY TO CARD

The read out to card mode of operation is initiated by a "punch" command from the control flip-flop 20. The card feed mechanism 16, timing device 26, sensing stations 24 and input gates 60 are inoperative at this time because the control flip-flop 20 does not supply the "read" signal. However, a timing device 84 in the card punch apparatus supplies a series of control pulses for each row of data to be punched on a card. One such timing pulse is applied through "or" gate 38 to trigger the master clock 40.

The master clock 40 generates eighty sets of clock pulses $CP_1 \ldots CP_5$ in response to each trigger. The $CP_1$ clock pulses trigger the character counter 44 as aforesaid, and the character counter 44 output is decoded for address of the high speed memory 50. Each $CP_2$ clock pulse brings a different pair of characters out of the high speed memory 50 to the data register 68. The data register outputs are supplied individually to a like number of output gates 82, which may be three-input "and" gates feeding a single "or" gate. The row counter 56 supplies an energizing signal to that "and" gate which corresponds to the row of data being read.

The single output of the output gate 82 is supplied as the serial input to an N bit memory C 88. Information in the memory C 88 is shifted one position in response to each $CP_4$ clock pulse. After N or 80 bits have been read into the memory C 88, a control pulse is supplied to a set of N punch drivers 92 to gate the outputs of the N bit memory C 88 to the punch device 92. These outputs, for example, may actuate punch solenoids in a known manner. A control pulse from the timing device 84 resets the N bit memory C 88 after the punch operation and before the next row of data is read from the high speed memory 50.

The sensing station 96 senses the row of card data immediately after punching. The next strobe pulse gates the outputs of the sensing station 96 in parallel to the N bit memory B 30 before the next row of data is read out of the high speed memory 50. While the second row of data is being read from the high speed memory 50, the first row of data therein is checked against the contents of the N bit register B 30 in the comparator 78.

The data transfer apparatus has been illustrated and described with respect to a card processing system in which the cards have eighty columns and twelve rows. Cards of other size also may be used in such a system without departing from the spirit of the invention. It may be necessary, of course, to adjust the capacity of the various counters, data register, etc. Also, it is to be understood that storage media other than cards may be used in practicing the invention. The system herein disclosed is by way of illustration only and constitutes no limitation of the invention.

What is claimed is:

1. In a system for transferring data from a storage medium having M row and N column storage positions, the combination comprising: a data register having M stages each for storing a binary digit; means for sensing a row of data in the storage medium and for transferring the sensed data one row position at a time to a selected stage of said data registers; a memory having at least M row and N column storage positions corresponding to the storage positions of the storage medium; means for reading out the data stored in the M row and N column storage positions of said memory a column at a time to corresponding stages of the data register, all of the M row and N column storage positions of said memory being read out to said data register once for each row sensing of the storage medium; and means for recording the data stored in said data register in a column of said memory after each column readout from said memory.

2. In a system for transferring data from a data storage medium having M rows each capable of storing N binary digits, the combination comprising: a data register having M stages corresponding respectively to said M rows, each stage for storing a binary digit; a memory having M rows and N columns of binary storage elements; means for transferring a row of data from said storage medium serially by digit in predetermined timed sequence to the corresponding stage of said data register; means for transferring the data stored in said storage elements parallel by column to said data register in the same said timed sequence, all of the N columns of said memory being read out once to said data register each time a row of data is transferred from said storage medium; and means for writing the contents of said data register into said memory.

3. In a system for transferring data from a storage medium having M rows each capable of storing N binary digits, the combination comprising: a data register having M stages each for storing a binary digit; a memory having M rows and N columns of binary storage elements; means for reading said storage medium a row at a time and for transferring the row of read data digit-by-digit in timed sequence to the one of said register stages corresponding to the row being read; means for reading the entire data contents of said memory one column at a time to said data register, in the same said timed sequence, each time a row of said storage medium is read; and means for writing the contents of said data register in parallel to said memory.

4. In a system for transferring data from a record card having M rows and N columns of binary storage positions, an N stage shift register; a data register having M binary storage stages; a memory having M rows and N columns of binary storage elements; reading means for reading a row of card data in parallel to said shift register; means for shifting out the data contents of said shift register serially by digit in timed sequence to a selected one of said M data register stages; means operative in the same said timed sequence for transferring the contents of said memory one column at a time in parallel to said data register, the contents of said memory being transferred in columnar form to said data register each time a different row of the record card is read; and means for writing the contents of said data register into said one column of said memory after each said one column transfer and before the next column transfer.

5. Apparatus for transferring the data contents of a record card having M rows and N columns of binary storage positions to a memory having corresponding storage positions comprising: said memory; a source of timing pulses; a data register having M bistable storage stages each corresponding to a different one of said M rows; means for sensing said record card storage positions row by row and for transferring the data stored in a row of said card storage positions serially to the corresponding stage of said data register in response to said timing pulses; means responsive to said timing pulses for reading out the data stored in said memory column by column to said data register in fixed time relation to said serial transfer, the N columns of said memory being read out to said data register once for each row sensing of said card; and means for recording the contents of said data register in said memory after each said column readout.

6. Apparatus for transferring data from a first memory having M rows and N columns of storage positions to a second memory having at least M rows and N columns of storage positions comprising: said second memory; means for sensing the contents of said first memory a row at a time and for generating electrical signals corresponding to sensed data; a source of timing pulses synchronized with the operation of said sensing means; an M stage data register; first means responsive to said timing pulses for reading out the entire contents of said second memory to said data register, a column at a time, each time a different row is sensed by said sensing means; second means responsive to said timing pulses for gating said electrical signals serially to a selected stage of said data register in fixed time relation to said second memory readout, each different electrical signal being gated to said selected stage as a different column of said second memory is read out; and means for recording the contents of said data register in said second memory in columnar fashion.

7. Apparatus for transferring data from a first memory having M rows and N columns of binary storage positions to a second memory having corresponding binary storage positions comprising: said second memory; means for reading said first memory a row at a time and for converting the data stored therein to electrical signals; a data register having M bistable storage stages each corresponding to a different one of said rows; a source of timing pulses; means responsive to said timing pulses for reading out the contents of said second memory a column at a time to said data register and for simultaneously applying said electrical signals serially to the stage of said data register corresponding to the row of data sensed in said first memory, the contents of said second memory being read out to said data register each time a different row of said first memory is read; and means for writing the contents of said data register back into said second memory.

8. In a system for use with a storage medium having M row and N column storage positions, the combination comprising: a data register having M bistable stages; means for reading out said storage medium a row at a time and for transferring the read data one row position at a time into a selected stage of said data register; a memory having M row and N column storage positions corresponding to the storage positions of said storage medium; means for reading out the data stored in said memory positions one column at a time to said data register; means for writing the contents of said data register back into said memory; and an N position shift register having an input terminal connected to receive the output of a selected stage of said data register.

9. In a system for handling record cards each having M row and N column storage positions, the combination comprising: a data register having M bistable stages; means for reading out a row of card data serially to a selected stage of said register; a memory having M row and N column storage positions; means for reading out the N columns of said memory, one column at a time, in parallel, to said data register each time a row of card data is read out to said register; means for writing the contents of said data register into a column of said memory before the next column is read out of said memory; and an N position register having an input terminal connected to receive the output of a selected stage of said data register.

10. In a system for reading and punching record cards each having M row and N column storage positions, the combination comprising: a data register having M bistable stages; a memory having M row and N column storage positions; means for sensing data on a record card a row at a time and for transferring the row of sensed data serially to a selected one of the M stages of said register; means for transferring the data stored in said memory positions a column at a time, in parallel, to said data register; means for writing the contents of said data register into a column of said memory before the next column of said memory is read out; an N position register having an input terminal coupled to receive the output of a selected stage of said data register; and means for recording the information stored in said N position register a row at a time on a record card.

11. In a system for reading and recording on record cards each having M row and N column storage position, the combination comprising: a data register having M bistable stages; means for reading out a row of card data serially to a selected one of said M bistable stages; a memory having M row and N column storage positions; means for transferring the data stored in said memory a column at a time to said data register and for circulating each column of data through said data register and back to said memory; an N position register having an input terminal coupled to receive the output of a selected one of said M bistable stages; means for recording the information stored in said N position register a row at a time on a record card; and means for selectively enabling one of said reading means and recording means.

12. In combination, a memory having M row and N column storage positions; a data register having M storage stages; means for transferring the data stored in said memory a column at a time to said data register; means for writing the contents of said data register into said one column of said memory before the next column is read out of said memory; an N position storage register; and switch means coupling the output of a selected one of said data register stages to said N position storage register.

References Cited in the file of this patent

UNITED STATES PATENTS

| | | |
|---|---|---|
| 2,702,380 | Brustman | Feb. 15, 1955 |
| 2,718,356 | Burrell | Sept. 20, 1955 |
| 2,963,685 | Laurer | Dec. 6, 1960 |
| 3,008,126 | Estrems | Nov. 7, 1961 |
| 3,025,499 | Evans | Mar. 13, 1962 |